Jan. 20, 1970 R. A. SPYRA 3,490,798
BALL-AND-SOCKET COUPLING
Filed Sept. 27, 1968 2 Sheets-Sheet 1
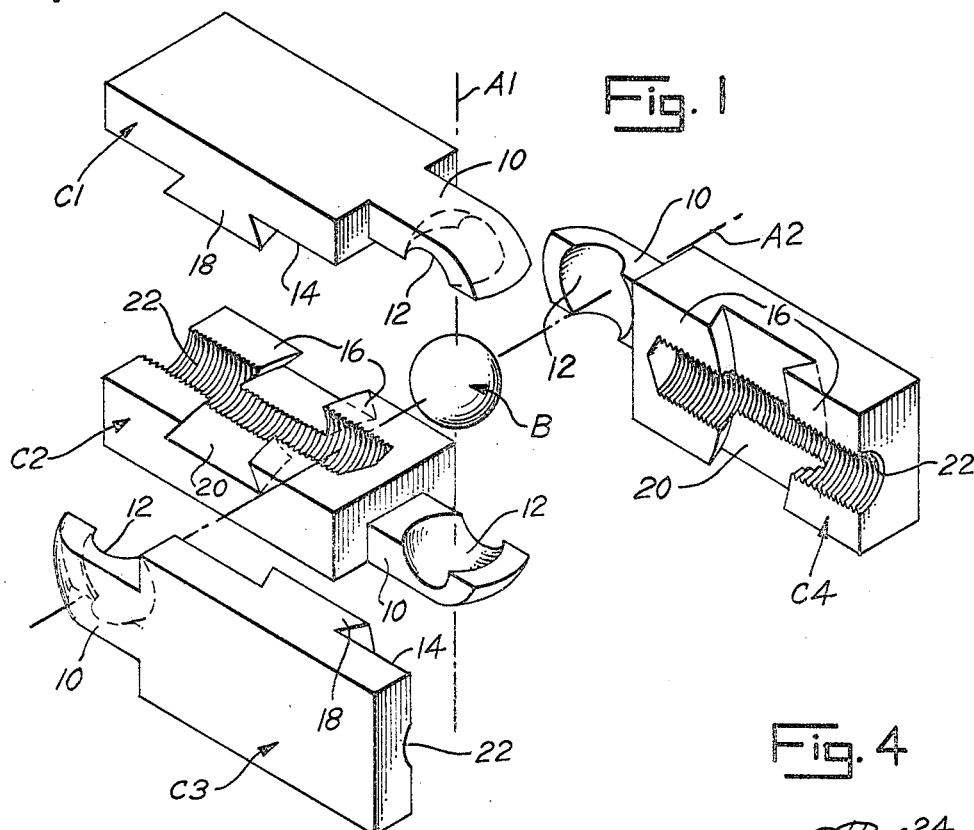
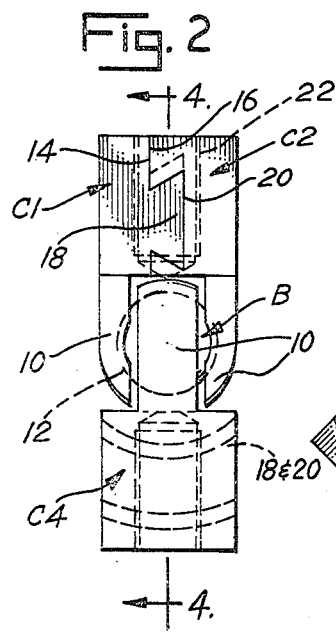
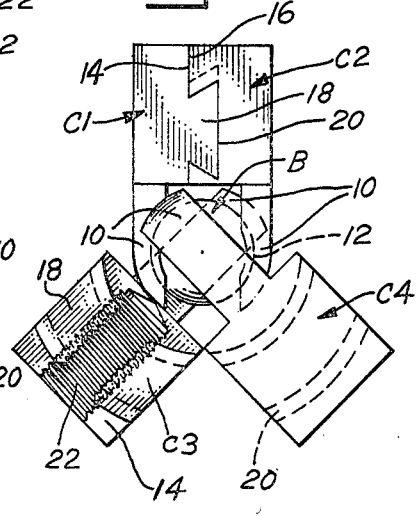
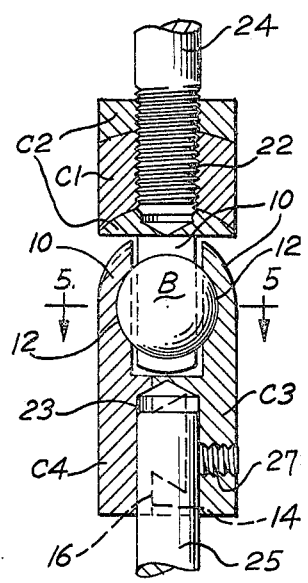
INVENTOR.
RUDOLF A. SPYRA
BY Bair, Freeman
& Molinare
ATTORNEYS Jan. 20, 1970          R. A. SPYRA          3,490,798
BALL-AND-SOCKET COUPLING
Filed Sept. 27, 1968                2 Sheets-Sheet 2
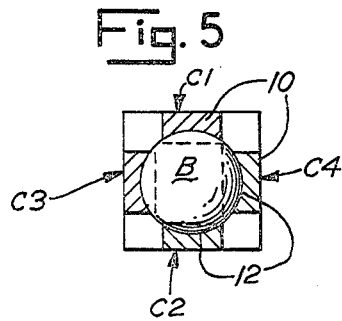
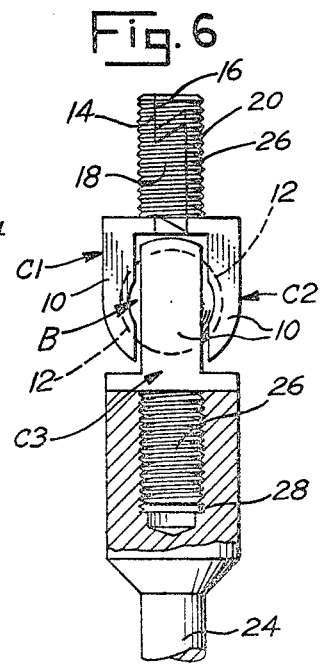
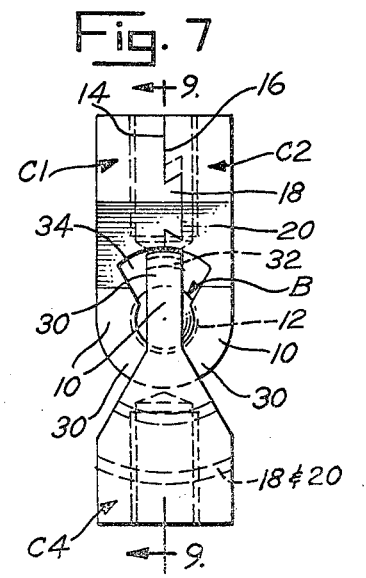
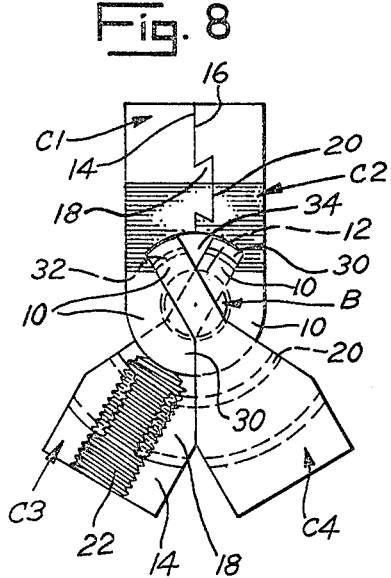
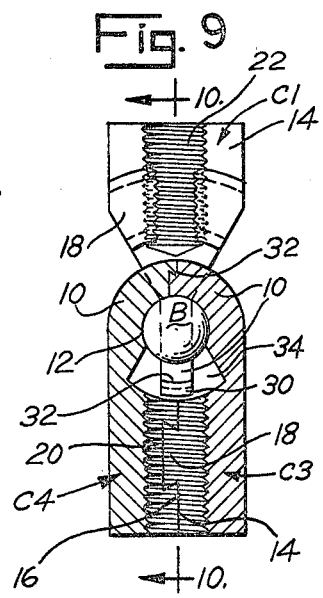
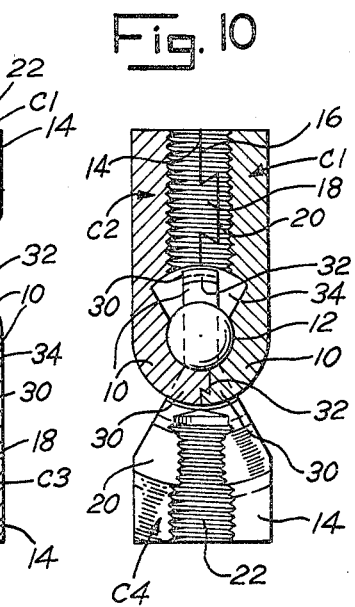
INVENTOR.
RUDOLF A. SPYRA
BY *Bair, Freeman*
*& Molinare*
ATTORNEYS United States Patent Office 3,490,798
Patented Jan. 20, 1970

3,490,798
BALL-AND-SOCKET COUPLING
Rudolf A. Spyra, 5344 N. Paulina, Chicago, Ill. 60640
Filed Sept. 27, 1968, Ser. No. 763,157
Int. Cl. F16c *11/06;* F16b *7/00*
U.S. Cl. 287—89         11 Claims

ABSTRACT OF THE DISCLOSURE

A ball-and-socket coupling comprising a ball member and a pair of coupling members. Each of the coupling members has a pair of socketed arms partially receiving opposite portions of the ball member, with the arms of one coupling member substantially crosswise of the arms of the other coupling member. Each coupling member is formed in two parts, which are assembled relative to each other without additional connecting means, the assembly being effected by means of a dove-tail joint connection between the two parts in which the dove-tail surfaces are generated about an axis of the ball member substantially normal to the bottoms of the sockets in the socketed arms. The outer ends of the socketed arms may extend around the ball and meet with a further dove-tail connction provided between such outer ends and also generated about the axis just referred to. The dove-tail connections are assembled by positioning them out of alignment, and then rotating them to aligned position. A simple means is provided for retaining the two parts of each coupling member in alignment comprising a threaded bore in the two parts and a rod threaded thereinto, or a threaded shank on the two parts which are retained in alignment by a socketed member threaded over the shank.

BACKGROUND OF THE INVENTION

In coupled lines of rods or the like used in certain machinery installations, it is desirable to move the line of rods longitudinally yet permit more flexibility than is possible with a solid rod devoid of joints. For this purpose, ball-and-socket couplings are provided between sections of the coupled rod line (a line of rod sections coupled together for longitudinal and/or angular displacement). One purpose of my present invention is to provide a comparatively simple ball-and-socket coupling for this purpose.

Heretofore ball-and-socket couplings have been provided comprising a ball member and a pair of coupling members in which each coupling member is formed in two parts in order to assemble them to the ball member. Such coupling members however, have required additional means such as bolts, screws or the like for holding the two parts of each coupling member together.

One object of my present invention therefore is to simplify prior devices by providing two-part coupling members in which each part has a socketed arm, the two parts having engaging surfaces which may be non-aligned for assembly and aligned for assembly, the movement from non-alignment to alignment being rotary in character about the axis of the ball and the two surfaces being provided with mating dove-tail joints permitting such movement and thereafter retaining the surfaces in engagement with each other and the socketed arms engaged with the ball member.

Another object is to provide an additional dove-tail joint between the outer ends of the arms on the far side of the ball member for additional strength in the coupling.

Still another object is to provide means to retain the two parts of each coupling member assembled comprising, either a bore partly in each or a shank partly on each, whereby the entry of a shaft or a rod of the coupled rod line into the bore retains the two parts of the bore in alignment and thereby the two parts of the coupling member in alignment and thereby in assembled relation, or the reception of the two-part shank in a socket of the coupled rod line similarly retains the two parts against subsequent misalignment and thereby disassembly.

BRIEF SUMMARY OF THE INVENTION

Two-part coupling members are provided having socketed arms which partially receive a ball member while the two parts of each coupling member are rotated out of alignment, and they may then be rotated into alignment with proper coaction of mating dove-tail joints generated on an axis of the ball member, whereupon if held in alignment they will remain assembled. By merely associating sockets of the coupling member with rods (which may or may not be threaded) of a coupled rod line, or shanks with socketed members in the rod line, no further means need be provided to retain my ball-and-socket coupling assembled.

BRIEF DESCRIPTION OF THE DRAWINGS

FIG. 1 is an exploded perspective view of five parts constituting my ball-and-socket coupling.

FIG. 2 is a fully assembled side elevation of my coupling.

FIG. 3 is a similar side elevation with the upper coupling member assembled and the lower one ready to assemble.

FIG. 4 is a vertical sectional view on the line 4—4 of FIG. 2, with the adition of a smooth rod and a threaded rod coacting with the coupling members after assembly.

FIG. 5 is a horizontal sectional view on the line 5—5 of FIG. 4.

FIG. 6 is a side elevation similar to FIG. 2, showing a modification of my coupling member wherein shanks rather than sockets are provided.

FIG. 7 is a side elevation similar to FIG. 2, showing a further modification.

FIG. 8 is a view similar to FIG. 3, showing the modification of FIG. 7.

FIG. 9 is a sectional view on the line 9—9 of FIG. 7, showing the lower coupling member in section, and only one of the two parts of the upper coupling member in elevation; and FIG. 10 is a similar sectional view on the line 10—10 of FIG. 9, showing the upper coupling member in section and only the far side one of the two parts of the lower coupling member.

On the accompanying drawings, and referring first to FIG. 1, a ball member B is illustrated and two pairs of coupling elements C1, C2, C3 and C4. The pair C1 and C2 form one coupling member, and the pair C3 and C4 form a second coupling member.

Each coupling element has an arm 10 extending from one end thereof, provided with a socket 12. The four sockets 12 are adapted to assemble with relation to the ball member B as shown in FIGS. 2, 3 and 4 for instance, two of the socketed arms 10 on opposite sides of the ball, and the other two socketed arms 10 also on opposite sides of the ball, but substantially crosswise relative to the first two.

The coupling elements are provided with adjacent surfaces 14 and 16, which are interrupted by a mating dove-tail joint, reference numeral 18 indicating a male part of the dove-tail joint on the coupling elements C1 and C3 and 20 a female part of the dove-tail joint in elements C2 and C4.

FIG. 1 illustrates an axis A1 of the ball member B, extending substantially normal to the bottoms of the sockets 12 of the coupling elements C1 and C2, and A2 an axis at substantially right angles to the axis A1 and normal to the bottoms of the sockets 12 of the coupling members C3 and C4. The dove-tail joints 18, 20 of the coupling elements C1 and C2 are generated on a curvature, the center of which is the axis A1, and similarly the dove-tail joints 18, 20 of the coupling elements C3 and C4 are generated about the axis A2. Accordingly, each pair of coupling elements which form a coupling member (C1 and C2 one coupling member and C3 and C4 another coupling member) may be positioned out of alignment as shown in FIG. 3 with their sockets 12 engaging opposite surfaces of the ball member B, and then rotated to aligned position as shown in FIG. 2, and they are thereby assembled.

It is now obvious that the two coupling elements of each coupling member may be held assembled by bolts or other means, but due to the dove-tail connection between them this is unnecessary when the coupling members are connected in a coupled rod line as will be evident from the following:

FIGS. 1, 2, 3 and 4 illustrate coupling members provided with a threaded bore 22, part of which is in one coupling element such as C1 and part of which is in the other coupling element such as C2, or part in C3 and part in C4, all as illustrated in FIG. 1. Referring to the upper half of FIG. 4, a rod 24 of the coupled rod line is threaded into the bore 22 and when so associated therewith, it prevents subsequent misalignment of the coupling elements, and thereby holds them against disassembly as to the position shown in FIG. 3 without the necessity of clamp bolts or any other type of connecting means between the two coupling elements of the coupling member. Alternatively a rod 25 which is not threaded may be inserted into an unthreaded bore 23, as shown in the lower half of FIG. 4 and held by a set screw 27. In either case, the rod, whether threaded or smooth, fits the bore in which it is received and thereby prevents subsequent misalignment of the two coupling elements of the coupling member.

Likewise as shown in FIG. 6, instead of bores 22 shanks 26 are provided on the coupling members, and are formed in two parts, one part on one of the coupling elements and one on the other. Therefore, when a socket 28 of the rod 24 in the coupled rod line is screwed onto the two part shank 26, it prevents the two coupling elements of the coupling member from being disassembled. Here also the socket 28 and the shank 26 may be unthreaded and a set screw provided to lock the two together as in the lower half of FIG. 4.

Referring to FIGS. 7, 8, 9 and 10 the modification disclosed comprises extensions 30 on the outer ends of the arms 10, which extend around the far side of the ball member B as shown in section in FIGS. 9 and 10 particularly, and dove-tail joints 32 between the meeting ends of the arms. As shown dotted in FIGS. 7 and 8 these dovetail joints 32 are also curved on a radius from the axis A1 and A2 as the case may be, so that assembly by rotation from the position of FIG. 8 to the position of FIG. 7 brings these dove-tail joints into holding coaction with each other. Thus the connection between the opposite coupling members is considerably strengthenend when the extensions 30 and the dove-tail joint 32 are used.

To accommodate the extensions 30 of the arms 10, their opposed coupling members is provided with a flared socket 34 which permits the pre-assembly position of FIG. 8 and subsequent angular position of the coupling members in the coupled rod lined during operations involving longitudinal and angular movements of the elements of the rod line.

I claim as my invention:

1. In a ball-and-socket coupling, a ball member and a pair of coupling members, each of said coupling members having a pair of socketed arms, the sockets of which partially receive opposite portions of said ball member with the pair of arms of one coupling member substantially crosswise of the pair of arms of the other coupling member, each of said coupling members comprising two parts, each part having one of said arms, and the two parts having, when assembled, adjacent surfaces in a plane between said arms, said means for connecting said two parts together comprising mating dove-tail joints curved on a radius from that axis of said ball member which extends normal to the bottoms of said sockets in said socketed arms.

2. A ball-and-socket coupling according to claim 1 wherein the plane of said adjacent surfaces extends through the center of said ball member.

3. A ball-and-socket coupling according to claim 1 wherein means is provided for retaining said two parts of each coupling member in alignment with each other after assembly with said ball member.

4. A ball-and-socket coupling according to claim 3 wherein said last means comprises a two-part bore partly in one part and partly in the other part of said coupling member, and which are held in alignment by a rod in said two-part bore.

5. A ball-and-socket coupling according to claim 4 wherein said bore and said rod are threadedly engaged with each other.

6. A ball-and-socket coupling according to claim 3 wherein said last means comprises a two-part shank, part of which is formed on one of said two parts and part of which is formed on the other of said two parts, and which are held in alignment by a socket member receiving said two-part shank.

7. A ball-and-socket coupling according to claim 6 wherein said shank and said socket member are threadedly engaged with each other.

8. A ball-and-socket coupling according to claim 1 wherein the outer ends of the two arms of said coupling member extend around said ball member to meet on the side thereof opposite the coupling member.

9. A ball-and-socket coupling according to claim 8 wherein said melting ends of said arms are provided with a dove-tail connection curved on a radius from said axis.

10. A ball-and-socket coupling according to claim 8 wherein each of said coupling members has a flared socket to accommodate said outer ends of the arms of the opposing coupling member.

11. A ball-and-socket coupling according to claim 9 wherein each of said coupling members has a flared socket to accommodate said outer ends of the arms of the opposed coupling member.

References Cited

UNITED STATES PATENTS

| | | | |
|---|---|---|---|
| 1,143,596 | 6/1915 | Bockhoff | 64—17 |
| 1,947,959 | 2/1934 | Williston | 64—17 |
| 2,795,465 | 6/1957 | Dwyer | 308—72 |

DAVID J. WILLIAMOWSKY, Primary Examiner

A. KUNDRAT, Assistant Examiner

U.S. Cl. X.R.

308—72